(12) United States Patent
Hara et al.

(10) Patent No.: US 11,370,457 B2
(45) Date of Patent: Jun. 28, 2022

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Yuki Hara, Wako (JP); Yasushi Shoda, Wako (JP); Junpei Noguchi, Wako (JP); Katsuyasu Yamane, Wako (JP); Yoshitaka Mimura, Wako (JP); Hiroshi Yamanaka, Wako (JP); Ryoma Taguchi, Tokyo (JP); Yuta Takada, Tokyo (JP); Chie Sugihara, Tokyo (JP); Yuki Motegi, Tokyo (JP); Tsubasa Shibauchi, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 124 days.

(21) Appl. No.: 16/817,667

(22) Filed: Mar. 13, 2020

(65) Prior Publication Data
US 2020/0307635 A1 Oct. 1, 2020

(30) Foreign Application Priority Data
Mar. 25, 2019 (JP) .............................. JP2019-056593

(51) Int. Cl.
*B60W 60/00* (2020.01)
*B60R 25/04* (2013.01)
*B60R 25/20* (2013.01)
*B60W 10/30* (2006.01)
(Continued)

(52) U.S. Cl.
CPC ......... *B60W 60/0025* (2020.02); *B60R 25/04* (2013.01); *B60R 25/2045* (2013.01); *B60W 10/04* (2013.01); *B60W 10/20* (2013.01); *B60W 10/30* (2013.01); *B60W 2540/223* (2020.02);
(Continued)

(58) Field of Classification Search
None
See application file for complete search history.

(56) References Cited

U.S. PATENT DOCUMENTS 5,717,387 A * 2/1998 Suman ............... G07C 9/00817
340/7.41
10,289,922 B1 * 5/2019 Wengreen ............. G08G 1/202
(Continued)

FOREIGN PATENT DOCUMENTS

JP 02-081749 3/1990
JP 2004-106587 4/2004
(Continued)

OTHER PUBLICATIONS

Japanese Office Action for Japanese Patent Application No. 2019-056593 dated Apr. 5, 2022.

*Primary Examiner* — Dale W Hilgendorf
(74) *Attorney, Agent, or Firm* — Amin, Turocy & Watson, LLP

(57) ABSTRACT

A vehicle control device of an embodiment includes a recognizer configured to recognize a peripheral situation of a vehicle and a controller configured to control a window portion of the vehicle, and the controller controls opening and closing of the window portion on the basis of a result of the recognizing has recognized a gesture which is performed by a user of the vehicle.

13 Claims, 9 Drawing Sheets

(51) Int. Cl.
*B60W 10/04* (2006.01)
*B60W 10/20* (2006.01)

(52) U.S. Cl.
CPC ..... *B60W 2554/00* (2020.02); *B60W 2710/20* (2013.01); *B60W 2720/10* (2013.01)

(56) References Cited

U.S. PATENT DOCUMENTS

| | | | | |
|---|---|---|---|---|
| 2008/0157510 | A1* | 7/2008 | Breed | B60R 21/01516 |
| | | | | 280/735 |
| 2014/0379175 | A1* | 12/2014 | Mittermeier | B60R 25/2045 |
| | | | | 701/2 |
| 2015/0120151 | A1* | 4/2015 | Akay | G07C 9/28 |
| | | | | 701/1 |
| 2015/0161836 | A1* | 6/2015 | Park | B60R 25/2045 |
| | | | | 340/5.51 |
| 2016/0098088 | A1* | 4/2016 | Park | B60K 35/00 |
| | | | | 345/156 |
| 2017/0103638 | A1* | 4/2017 | Henry | G08B 5/36 |
| 2018/0094471 | A1* | 4/2018 | Mitchell | E05F 15/655 |
| 2018/0285635 | A1* | 10/2018 | Arata | G06K 9/00375 |
| 2018/0319406 | A1* | 11/2018 | Dudar | B60W 50/0098 |
| 2019/0308612 | A1* | 10/2019 | Lavoie | B60R 25/24 |
| 2019/0308613 | A1* | 10/2019 | Lavoie | B60R 25/245 |
| 2019/0308614 | A1* | 10/2019 | Lavoie | B60W 30/06 |
| 2020/0285240 | A1* | 9/2020 | Diehl | G06F 21/35 |
| 2020/0293799 | A1* | 9/2020 | Herman | H04W 4/40 |
| 2020/0301413 | A1* | 9/2020 | Wengreen | G05D 1/0055 |
| 2020/0307608 | A1* | 10/2020 | Yamanaka | B60W 50/14 |

FOREIGN PATENT DOCUMENTS

| | | |
|---|---|---|
| JP | 2005-047343 | 2/2005 |
| JP | 2005-315024 | 11/2005 |
| JP | 2007-001724 | 1/2007 |
| JP | 2007-162459 | 6/2007 |
| JP | 2012-123491 | 6/2012 |
| JP | 2012-172367 | 9/2012 |
| JP | 2018-075901 | 5/2018 |
| WO | 2018/083778 | 5/2018 |

* cited by examiner

| TYPE OF GESTURE | BODY CONTROL |
|---|---|
| GESTURE A | OPEN POWER WINDOW |
| GESTURE B | OPEN SLIDE DOOR |
| ... | ... |

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2019-056593, filed Mar. 25, 2019, the content of which is incorporated herein by reference.

BACKGROUND

Field of the Invention

The present invention relates to a vehicle control device, a vehicle control method, and a storage medium.

Description of Related Art

In recent years, there has been progress in research for automatic control of a vehicle. In connection with this, a technique in which the doors of a vehicle are automatically unlocked or automatically opened on the basis of information of a smart key used by a user while the user is aboard a vehicle has been disclosed (for example, Japanese Unexamined Patent Application, First Publication No. 2007-162459). In addition, a technique in which a user is notified of the misplacement of an article that the user has taken into a vehicle has been disclosed (for example, Japanese Unexamined Patent Application, First Publication No. 2007-1724).

SUMMARY

However, in the related art, opening a door or a power window in accordance with the type of misplaced article or a user's situation has not been sufficiently considered.

The present invention was contrived in view of such circumstances, and one object thereof is to provide a vehicle control device, a vehicle control method, and a storage medium that make it possible to perform proper opening control of a power window in accordance with a user's situation.

A vehicle control device, a vehicle control method, and a storage medium according to this invention have the following configurations adopted therein.

(1) According to an aspect of this invention, there is provided a vehicle control device including: a recognizer configured to recognize a peripheral situation of a vehicle; and a controller configured to control opening and closing of a window portion of the vehicle, wherein the controller controls opening and closing of the window portion on the basis of a result of the recognizer recognizing a gesture which is performed by a user of the vehicle.

(2) In the aspect of the above (1), the recognizer further recognizes a position of the user, and in a case where the recognizer recognizes a gesture of a request for opening window portions and a position of the user who has performed the gesture, the controller opens a window portion closest to the position of the user among the window portions.

(3) In the aspect of the above (1), in a case where the recognizer recognizes a gesture of a request for closing window portions, the controller closes a window portion closest to a position of the user among the window portions.

(4) In the aspect of the above (1), a lost article detector configured to detect a lost article located in an interior of the vehicle is further included, the lost article detector determines whether the lost article is able to be taken out of the vehicle through the window portion, and the controller opens a window portion closest to the lost article among the window portions on the basis of a detection result of the lost article detector.

(5) In the aspect of the above (4), in a case where it is detected by the lost article detector that the lost article is recovered by the user, and a gesture of a request for closing window portions is further recognized by the recognizer, the controller closes an opened window portion on the basis of the gesture recognized by the recognizer.

(6) In the aspect of the above (4), the controller closes an opened window portion on the basis of a gesture recognized by the recognizer in a case where a predetermined time has elapsed since some or all of the window portions were opened on the basis of the gesture recognized by the recognizer.

(7) In the aspect of the above (4), in a case where the user's gesture for prompting start of the vehicle is recognized by the recognizer, the controller closes an opened window portion on the basis of the gesture recognized by the recognizer.

(8) In the aspect of the above (7), a driving controller configured to control steering and a speed of the vehicle irrespective of the user's operation on the basis of a recognition result of the recognizer is further included, and the driving controller starts the vehicle after completion of closing control of a window portion on which opening control is performed on the basis of the gesture for prompting start of the vehicle recognized by the recognizer.

(9) In the aspect of the above (4), in a case where it is determined that the lost article is able to be taken out of the vehicle through any of the window portions, the controller performs at least one of opening and closing one or more doors or some or all of the window portions of the vehicle in a different mode from that when a lost article is taken out through the window portion.

(10) In the aspect of the above (9), the controller opens all the window portions of the vehicle in a case where it is determined that the lost article is not able to be taken out of the vehicle through any of the window portions.

(11) In the aspect of the above (9), the controller opens a door closest to the user or a door closest to the lost article in a case where it is determined that the lost article is not able to be taken out of the vehicle through any of the window portions.

(12) In the aspect of the above (4), in a case where an article loaded at a boarding start point by the user is returned to the boarding start point without being taken down from the vehicle at a destination or a transit point, the lost article detector excludes the article as a target to be detected as the lost article.

(13) In the aspect of the above (1), the recognizer recognizes weather conditions around the vehicle and does not open the window portion in a case where there is a falling matter in a space around the vehicle.

(14) According to an aspect of this invention, there is provided a vehicle control method including causing a vehicle control device to: recognize a peripheral situation of a vehicle; and control opening and closing of a window portion of the vehicle on the basis of a result of recognition of a gesture which is performed by a user who is outside of the vehicle.

(15) According to an aspect of this invention, there is provided a computer readable non-transitory storage medium having a program stored therein, the program causing a vehicle control device to: recognize a peripheral situation of a vehicle; and control opening and closing of a window portion of the vehicle on the basis of a result of recognition of a gesture which is performed by a user of the vehicle who is outside of the vehicle.

According to the aspects of the above (1) to (15), it is possible to perform appropriate opening control of the window portion in accordance with the user's situation.

According to the aspects of the above (5) to (8), it is possible to further perform appropriate closing control of the window portion in accordance with the user's situation.

According to the aspect of the above (9), it is possible to further perform appropriate starting control of the vehicle in accordance with closing control of the window portion.

According to the aspects of the above (10) to (12), it is possible to further perform appropriate opening control and closing control of the window portion in accordance with the detected lost article.

According to the aspect of the above (13), it is possible to further perform appropriate closing control of the window portion in accordance with the weather conditions around the vehicle.

DESCRIPTION OF EMBODIMENTS

Hereinafter, an embodiment of a vehicle control device, a vehicle control method, and a storage medium of the present invention will be described with reference to the accompanying drawings.

[Overall Configuration]

Figure 1:
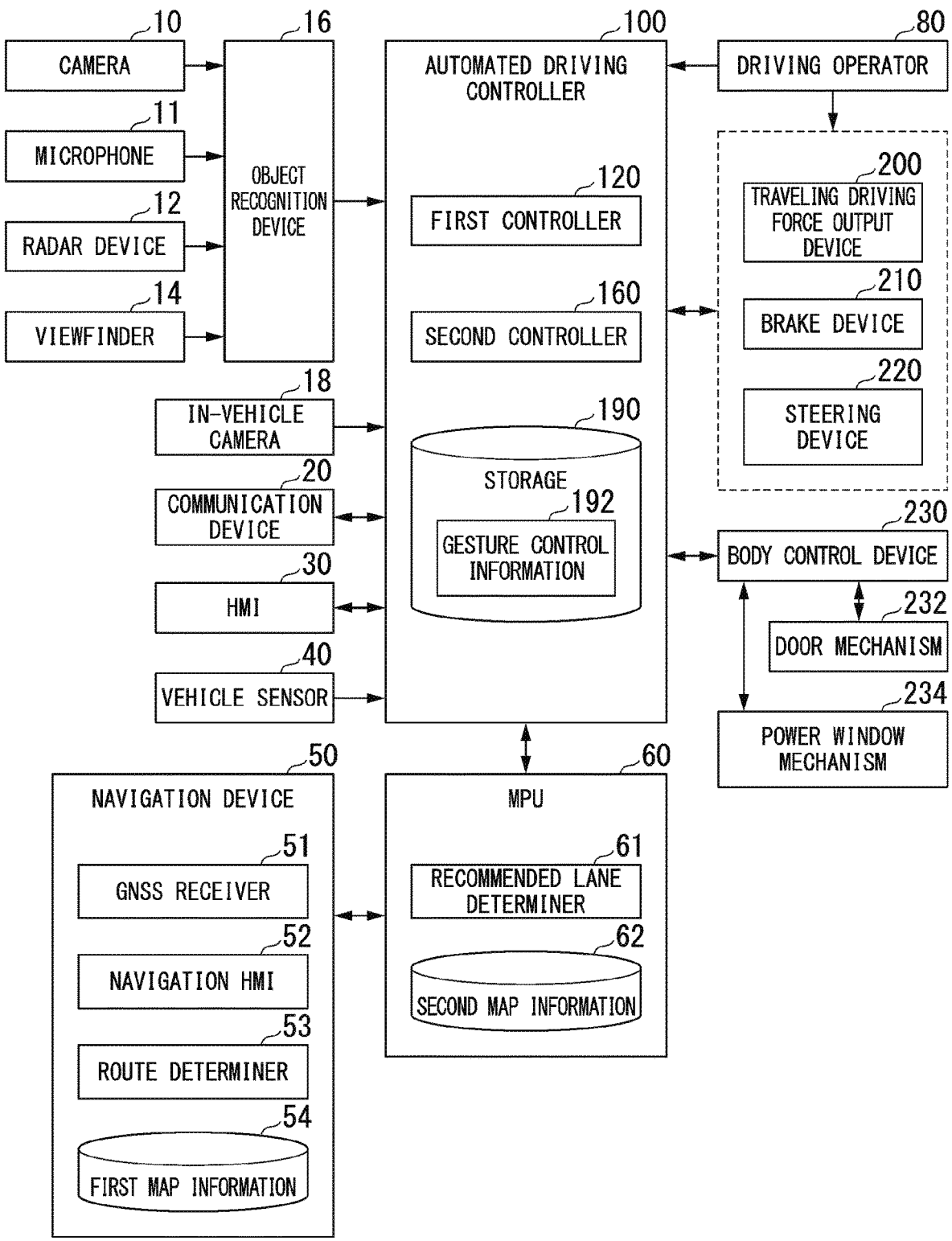
FIG. 1 is a configuration diagram of a vehicle system using a vehicle control device according to an embodiment.

FIG. 1 is a configuration diagram of a vehicle system 1 in which a vehicle control device according to an embodiment is used. For the purpose of the present invention, a vehicle is not limited to an automated driving vehicle, and the automated driving vehicle will be described by way of example only. A vehicle having the vehicle system 1 mounted therein is, for example, a two-wheeled, three-wheeled, or four-wheeled vehicle or the like, and the driving source thereof is an internal-combustion engine such as a diesel engine or a gasoline engine, an electric motor, or a combination thereof. The electric motor operates using power generated by a generator connected to an internal-combustion engine or discharging power of a secondary battery or a fuel cell.

The vehicle system 1 includes, for example, a camera 10, a microphone 11, a radar device 12, a viewfinder 14, an object recognition device 16, an in-vehicle camera 18, a communication device 20, a human machine interface (HMI) 30, a vehicle sensor 40, a navigation device 50, a map positioning unit (MPU) 60, a driving operator 80, an automated driving controller 100, a traveling driving force output device 200, a brake device 210, a steering device 220, and a body control device 230. These devices or instruments are connected to each other through a multiplex communication line such as a controller area network (CAN) communication line, a serial communication line, a wireless communication network, or the like. The configuration shown in FIG. 1 is merely an example, and some portions of the configuration may be omitted, or other configurations may be further added. The automated driving controller 100 is an example of a "vehicle control device."

The camera 10 is a digital camera using a solid-state imaging element such as, for example, a charge coupled device (CCD) or a complementary metal oxide semiconductor (CMOS). The camera 10 is installed at any point on a vehicle having the vehicle system 1 mounted therein (hereinafter referred to as a host vehicle M). In a case where a forward image is captured, the camera 10 is installed on the upper portion of the front windshield, the rear surface of the rear-view mirror, or the like. The camera 10, for example, repeatedly captures an image of the vicinity of the host vehicle M periodically. The camera 10 may be a stereo camera.

The microphone 11 collects, for example, sounds in the vicinity (including at least a position at which a user of the vehicle stops when boarding and exiting the host vehicle M) of the host vehicle M.

The radar device 12 radiates radio waves such as millimeter waves to the vicinity of the host vehicle M, and detects radio waves (reflected waves) reflected from an object to detect at least the position (distance to and orientation of) of the object. The radar device 12 is installed at any point of the host vehicle M. The radar device 12 may detect the position and speed of an object with a frequency modulated continuous wave (FM-CW) system.

The viewfinder 14 is a light detection and ranging (LI-DAR) viewfinder. The viewfinder 14 irradiates the vicinity of the host vehicle M with light, and measures scattered light. The viewfinder 14 detects a distance to an object on the basis of a time from light emission to light reception. The irradiation light is, for example, pulsed laser light. The viewfinder 14 is installed at any point on the host vehicle M.

The object recognition device 16 recognizes the position, type, speed, or the like of an object by performing a sensor fusion process on the results of detection performed by some or all of the camera 10, the radar device 12, and the viewfinder 14. The object recognition device 16 outputs recognition result to the automated driving controller 100. The object recognition device 16 may output the detection results of the camera 10, the radar device 12, and the viewfinder 14, as they are, to the automated driving controller 100. The object recognition device 16 may be omitted from the vehicle system 1.

The in-vehicle camera 18 is a digital camera using a solid-state imaging element such as, for example, a CCD or a CMOS. The in-vehicle camera 18 is installed at any point on the host vehicle M, and images the interior of the host vehicle M. Examples of spaces imaged by the in-vehicle camera 18 include the periphery or a seat or a door pocket, a sun visor, a cup holder, or the like. The in-vehicle camera 18 images, for example, the interior of the host vehicle M periodically repeatedly. The in-vehicle camera 18 may be a stereo camera.

The communication device 20 communicates with another vehicle or another device which is present in the periphery of the host vehicle M using, for example, a cellular network, a Wi-Fi network, Bluetooth (registered trademark), dedicated short range communication (DSRC), or the like.

The HMI 30 presents various types of information to a user of the host vehicle M, and accepts the user's input operation. The HMI 30 includes various display devices, a speaker, a buzzer, a touch panel, a switch, a key, and the like.

The vehicle sensor 40 includes a vehicle speed sensor that detects the speed of the host vehicle M, an acceleration sensor that detects an acceleration, a yaw rate sensor that detects an angular velocity around a vertical axis, an orientation sensor that detects the direction of the host vehicle M, or the like.

The navigation device 50 includes, for example, a global navigation satellite system (GNSS) receiver 51, a navigation HMI 52, and a route determiner 53. The navigation device 50 holds first map information 54 in a storage device such as a hard disk drive (HDD) or a flash memory. The GNSS receiver 51 specifies the position of the host vehicle M on the basis of a signal received from a GNSS satellite. The position of the host vehicle M may be specified or complemented by an inertial navigation system (INS) in which an output of the vehicle sensor 40 is used. The navigation HMI 52 includes a display device, a speaker, a touch panel, a key, and the like. A portion or the entirety of the navigation HMI 52 may be shared with the above-described HMI 30. The route determiner 53 determines, for example, a route (hereinafter, a route on a map) from the position (or any input position) of the host vehicle M specified by the GNSS receiver 51 to a destination input by a user using the navigation HMI 52 with reference to the first map information 54. The first map information 54 is, for example, information in which a road shape is represented by a link indicating a road and nodes connected by the link. The first map information 54 may include the curvature of a road, point of interest (POI) information, or the like. The route on a map is output to the MPU 60. The navigation device 50 may perform route guidance using the navigation HMI 52 on the basis of the route on a map. The navigation device 50 may be realized by the function of a terminal device such as, for example, a smartphone or a tablet terminal possessed by a user. The navigation device 50 may transmit its current position and destination to a navigation server through the communication device 20, and acquire the same route as the route on a map from the navigation server.

The MPU 60 includes, for example, a recommended lane determiner 61, and holds second map information 62 in a storage device such as an HDD or a flash memory. The recommended lane determiner 61 divides the route on a map provided from the navigation device 50 into a plurality of blocks (for example, divides the route on a map every 100 [m] in a vehicle traveling direction), and determines a recommended lane for each block with reference to the second map information 62. The recommended lane determiner 61 makes a determination on which lane from the left to travel along. In a case where a branch point is present in the route on a map, the recommended lane determiner 61 determines a recommended lane so that the host vehicle M can travel along a rational route for advancing to a branch destination.

The second map information 62 is map information having a higher accuracy than that of the first map information 54. The second map information 62 includes, for example, information of the center of a lane, information of the boundary of a lane, or the like. The second map information 62 may include road information, traffic regulations information, address information (address or zip code), facility information, telephone number information, or the like. The second map information 62 may be updated when necessary by the communication device 20 communicating with another device.

The driving operator 80 includes, for example, an accelerator pedal, a brake pedal, a shift lever, a steering wheel, a variant steering wheel, a joystick, and other operators. A sensor that detects the amount of operation or the presence or absence of operation is installed on the driving operator 80, and the detection results are output to the automated driving controller 100, or some or all of the traveling driving force output device 200, the brake device 210, and the steering device 220.

The automated driving controller 100 includes, for example, a first controller 120, a second controller 160, and a storage 190. The first controller 120 and the second controller 160 are realized by a hardware processor such as, for example, a central processing unit (CPU) executing a program (software). Some or all of these components may be realized by hardware (circuit unit; including circuitry) such as a large scale integration (LSI), an application specific integrated circuit (ASIC), a field-programmable gate array (FPGA), or a graphics processing unit (GPU), and may be realized by software and hardware in cooperation. The program may be stored in a storage device such as the HDD or the flash memory (a storage device including a non-transitory storage medium) of the storage 190 in advance, may be stored in a detachable storage medium such as a DVD or a CD-ROM, or may be installed in the HDD or the flash memory of the storage 190 by the storage medium (the non-transitory storage medium) being mounted in a drive device.

The storage 190 is realized by, for example, an HDD, a flash memory, an electrically erasable programmable read only memory (EEPROM), a read only memory (ROM), a random access memory (RAM), or the like. The storage 190 stores, for example, a program which is read out and executed by a processor, gesture control information 192, or the like. The gesture control information 192 will be described later.

Figure 2:
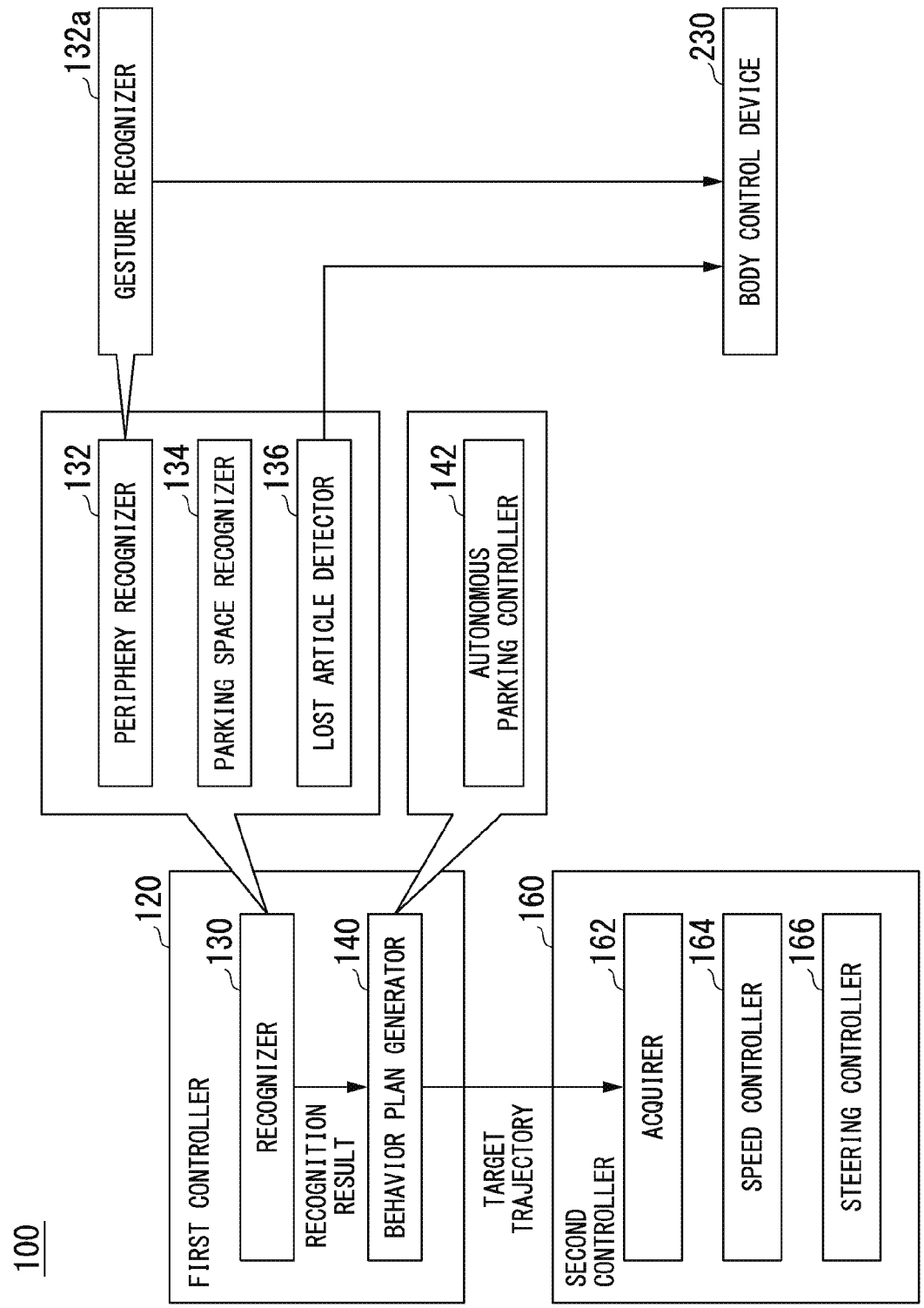
FIG. 2 is a functional configuration diagram of a first controller and a second controller.

FIG. 2 is a functional configuration diagram of the first controller 120 and the second controller 160. The first controller 120 includes, for example, a recognizer 130 and a behavior plan generator 140. The first controller 120 concurrently realizes, for example, a function based on artificial intelligence (AI) and a function based on a model imparted in advance. For example, a function of "recognizing a point of intersection" may be realized by the recognition of a point of intersection based on deep learning or the like and recognition based on conditions (such as a signal or a road sign on which pattern matching is possible) imparted in advance being concurrently executed, and being comprehensively evaluated by performing scoring on both. Thereby, the reliability of automated driving is secured. The first controller 120 and the second controller 160 are an example of a "driving controller."

The recognizer 130 includes a periphery recognizer 132, a parking space recognizer 134, and a lost article detector 136. The periphery recognizer 132 recognizes the position and speed of an object near the host vehicle M, and the state of acceleration or the like on the basis of information which is input from the camera 10, the radar device 12, and the viewfinder 14 through the object recognition device 16. The position of the object is recognized as, for example, a position in absolute coordinates with a representative point (such as the centroid or the center of a drive shaft) of the host vehicle M as an origin, and is used in control. The position of the object may be represented by a representative point such as the centroid or a corner of the object, or may be represented by a representative region. The "state" of the object may include the acceleration or jerk of the object, or a "behavior state" (for example, whether it is performing or attempting to perform a lane change).

The periphery recognizer 132 recognizes, for example, a lane (traveling lane) along which the host vehicle M travels. For example, the periphery recognizer 132 may recognize a traveling lane by comparing a pattern of a road partition line (for example, an array of solid lines and broken lines) obtained from the second map information 62 with a pattern of a road partition line located in the vicinity of the host vehicle M which is recognized from an image captured by the camera 10. The periphery recognizer 132 may recognize a traveling lane by recognizing a driving boundary (road boundary) including a road partition line, a shoulder, a curbstone, a median strip, a guardrail, or the like without being limited to the recognition of a road partition line. In this recognition, the position of the host vehicle M acquired from the navigation device 50 or processing results based on an INS may be added. The periphery recognizer 132 recognizes a stop line, an obstacle, a red light, a tollbooth, and other road events.

Upon recognizing a traveling lane, the periphery recognizer 132 recognizes the position or posture of the host vehicle M with respect to the traveling lane. The periphery recognizer 132 may recognize, for example, deviation of the host vehicle M from the center of the lane which is a reference point, and an angle formed with respect to a line aligned along the center of the lane of the host vehicle M in its traveling direction, as the relative position and posture of the host vehicle M with respect to the traveling lane. Instead, the recognizer 130 may recognize the position of the reference point of the host vehicle M or the like with respect to either lateral end portion (a road partition line or a road boundary) of the traveling lane, as the relative position of the host vehicle M with respect to the traveling lane.

The periphery recognizer 132 includes, for example, a gesture recognizer 132a. The gesture recognizer 132a recognizes a gesture (or body language) of a user who is outside of the host vehicle M on the basis of the information which is input from the camera 10, the radar device 12, and the viewfinder 14 through the object recognition device 16. For example, in a case where it is recognized that one or more objects are present outside of the host vehicle M, the gesture recognizer 132a recognizes a user who boards the host vehicle M from the recognized one or more objects. The gesture recognizer 132a further analyzes an operation such as the recognized user's motion or hand signal, and recognizes a gesture indicating a specific meaning. The gesture recognizer 132a outputs information indicating the recognized user's gesture to the body control device 230. The gesture which is recognized by the gesture recognizer 132a may include a recognition result of the user's voice collected by the microphone 11.

The details of the functions of the parking space recognizer 134 and the lost article detector 136 will be described later.

The behavior plan generator 140 generates a target trajectory along which the host vehicle M will travel in the future automatically (irrespective of a driver's operation) so that the host vehicle M travels in the recommended lane determined by the recommended lane determiner 61 in principle and can cope with the peripheral situation of the host vehicle. The target trajectory includes, for example, a speed element. For example, the target trajectory may be represented as a trajectory obtained by arranging points (trajectory points) at which the host vehicle M will arrive in order. The trajectory points are points at which the host vehicle M will arrive after predetermined traveling distances (for example, approximately every several [m]) which are distances along a road. Separately from the trajectory points, a target speed and a target acceleration for each predetermined sampling time (for example, approximately several tenths of a [sec]) are generated as a portion of the target trajectory. The trajectory points may be positions at which the host vehicle M will arrive at sampling times for respective predetermined sampling times. In this case, information of a target speed or target acceleration is represented by an interval between trajectory points.

The behavior plan generator 140 determines an event of automated driving in a route in which a recommended lane is determined. The event is information in which a traveling mode of the host vehicle M is specified. The term "automated driving" refers to controlling one or both of the steering or speed of the host vehicle M irrespective of the operation of the driving operator 80 which is performed by a user of the host vehicle M and causing the host vehicle M to travel. On the other hand, the term "manual driving" refers to the steering and speed of the host vehicle M being controlled in accordance with a user's operation of the driving operator 80. The event of automated driving is a mode of behavior which is taken by the host vehicle M under the above-described automated driving, that is, information in which a traveling mode is specified.

The events includes, for example, a parking event of causing the host vehicle M to travel autonomously and be parked in a parking space as in valet parking rather than a user of the host vehicle M parks the host vehicle M in the parking space by himself (or herself), a stop event of stopping the host vehicle M on the spot, a forward event of moving the host vehicle M forward while slowing the vehicle down, a backward event of moving the host vehicle M backward while slowing the vehicle down.

The events may include, for example, a constant-speed traveling event of causing the host vehicle M to travel in the same lane at a constant speed, a following traveling event of causing the host vehicle M to follow another vehicle (hereinafter referred to as a preceding vehicle) which is present within a predetermined distance (within, for example, 100 [m]) in front of the host vehicle M and is closest to the host vehicle M, a lane change event of changing the lane of the host vehicle M from a host lane to an adjacent lane, a divergence event of causing the host vehicle M to diverge in an objective lane at a divergence point of a road, a merging event of causing the host vehicle M to merge into a main line at a merging point, a passing event of temporarily changing the lane of the host vehicle M in an adjacent lane, passing a preceding vehicle in the adjacent lane and then changing the lane to an original lane again, an avoidance event of causing the host vehicle M to perform at least one of braking and steering in order to avoid an obstacle which is present in front of the host vehicle M, an overtaking event of terminating automated driving and switching the automated driving to manual driving, and the like. The term "following" may be, for example, a traveling mode of maintaining a relative distance (inter-vehicle distance) between the host vehicle M and a preceding vehicle constant, or may be a traveling mode of causing the host vehicle M to travel in the center of a host lane in addition to maintaining the relative distance between the host vehicle M and a preceding vehicle constant.

The behavior plan generator 140 may change an event already determined with respect to the current section or the next section to another event in accordance with a peripheral situation recognized by the recognizer 130 during traveling of the host vehicle M, or may determine a new event with respect to the current section or the next section.

The behavior plan generator 140 generates a future target trajectory along which the host vehicle M is caused to travel automatically (irrespective of a driver's operation) in a traveling mode specified by an event so that the host vehicle M travels in a recommended lane determined by the recommended lane determiner 61 in principle and copes with its peripheral situation when the host vehicle M travels the recommended lane. The target trajectory includes, for example, a position element for determining a future position of the host vehicle M and a speed element for determining a future speed, acceleration or the like of the host vehicle M.

For example, the behavior plan generator 140 determines a plurality of points (trajectory points) at which the host vehicle M will arrive in order as position elements of a target trajectory. The trajectory points are points at which the host vehicle M will arrive after predetermined traveling distances (for example, approximately every several [m]). The predetermined traveling distances may be calculated by, for example, a distance along a road when advancing along a route.

The behavior plan generator 140 determines a target speed or a target acceleration for each predetermined sampling time (for example, approximately several tenths of a second) as speed elements of a target trajectory. The trajectory points may be positions at which the host vehicle M will arrive at sampling times for respective predetermined sampling times. In this case, the target speed or the target acceleration is determined by intervals between sampling times and trajectory points. The behavior plan generator 140 outputs information indicating the generated target trajectory to the second controller 160.

The behavior plan generator 140 includes, for example, an autonomous parking controller 142 to be started up in a case where the autonomous parking event is executed. The details of the function of the autonomous parking controller 142 will be described later.

The second controller 160 controls the traveling driving force output device 200, the brake device 210, and the steering device 220 so that the host vehicle M passes along the target trajectory generated by the behavior plan generator 140 according to scheduled times.

The second controller 160 includes, for example, an acquirer 162, a speed controller 164, and a steering controller 166. The acquirer 162 acquires information of target trajectory (trajectory point) generated by the behavior plan generator 140, and stores the acquired information in a memory (not shown). The speed controller 164 controls the traveling driving force output device 200 or the brake device 210 on the basis of a speed element associated with the target trajectory stored in the memory. The steering controller 166 controls the steering device 220 in accordance with the bent state of the target trajectory stored in the memory. The processes of the speed controller 164 and the steering controller 166 are realized by, for example, a combination of feedforward control and feedback control. As an example, the steering controller 166 executes a combination of feedforward control according to the curvature of a road in front of the host vehicle M and feedback control based on deviation from the target trajectory.

The traveling driving force output device 200 outputs a traveling driving force (torque) for a vehicle to travel to a driving wheel. The traveling driving force output device 200 includes, for example, a combination of an internal-combustion engine, an electric motor, a transmission or the like, and an electronic control unit (ECU) that controls these components. The ECU controls the above components in accordance with information which is input from the second controller 160 or information which is input from the driving operator 80.

The brake device 210 includes, for example, a brake caliper, a cylinder that transfers hydraulic pressure to the brake caliper, an electric motor that generates hydraulic pressure in the cylinder, and a brake ECU. The brake ECU controls the electric motor in accordance with the information which input from the second controller 160 or the information which input from the driving operator 80, and causes a brake torque according to a braking operation to be output to each wheel. The brake device 210 may include a mechanism that transfers hydraulic pressure generated by the operation of a brake pedal included in the driving operator 80 through a master cylinder to the cylinder as a backup. The brake device 210 is not limited to the above-described configuration, and may be an electronic control type hydraulic brake device that controls an actuator in accordance with the information which is input from the second controller 160 and transfers hydraulic pressure of the master cylinder to the cylinder.

The steering device 220 includes, for example, a steering ECU and an electric motor. The electric motor changes the direction of a turning wheel, for example, by causing a force to act on a rack and pinion mechanism. The steering ECU drives the electric motor in accordance with the information which is input from the second controller 160 or the information which is input from the driving operator 80, and changes the direction of the turning wheel.

The body control device 230 controls, for example, a door mechanism 232 and a power window mechanism 234. The body control device 230 may control only the power window mechanism 234. The body control device 230 is an example of a "controller," and the power window mechanism 234 is an example of a "window portion."

The door mechanism 232 includes, for example, a door locking device that sets one or more doors of the host vehicle M to be in a door locking state or a door unlocking state. In a case where the host vehicle M has a slide door, the door mechanism 232 includes a device for opening and closing the slide door.

The power window mechanism 234 includes, for example, a device for driving one or more power windows of the host vehicle M, and opens and closes the window portion (window) of the host vehicle M.

Figure 3:
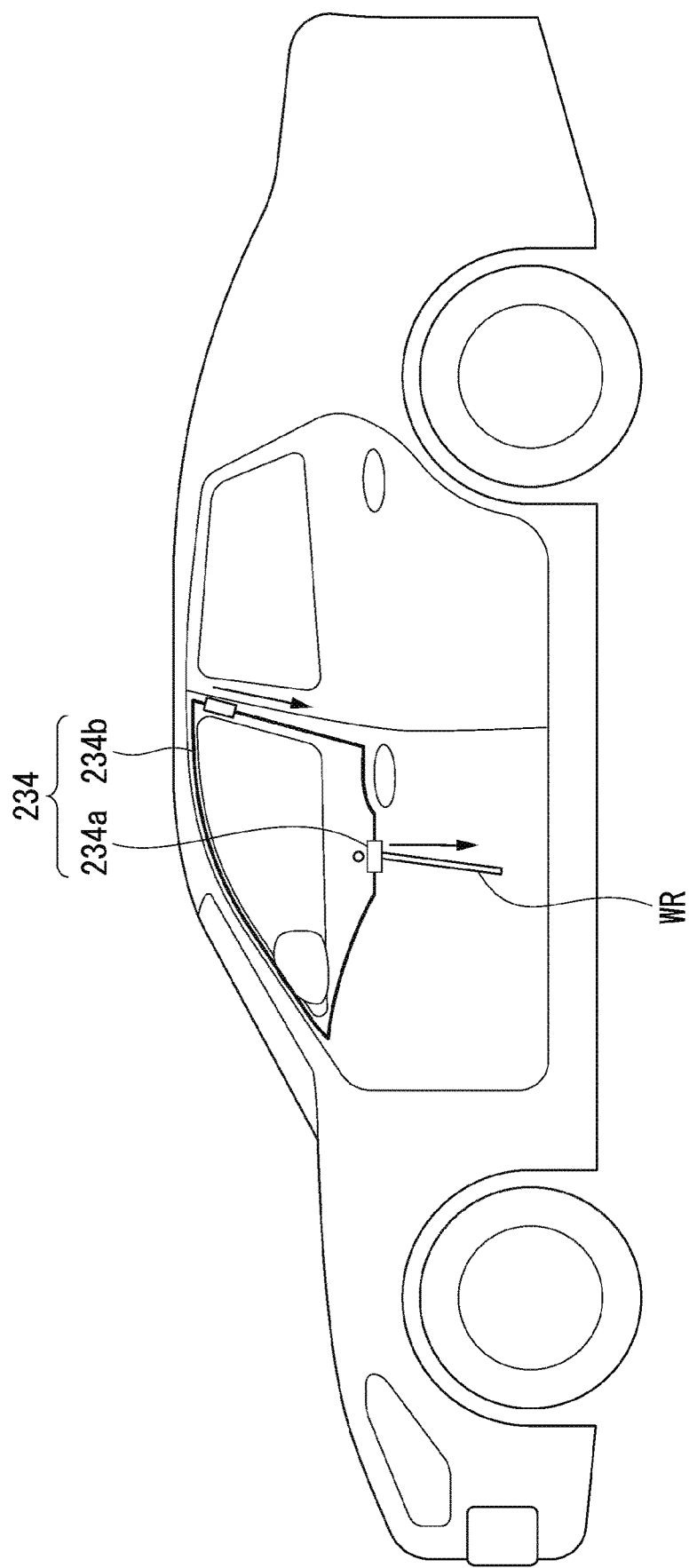
FIG. 3 is a diagram showing an example of an outward appearance of a power window mechanism.

FIG. 3 is a diagram showing an example of an outward appearance of the power window mechanism 234. As shown in FIG. 3, the power window mechanism 234 includes, for example, a window portion 234a and a driver 234b. The window portion 234a and the driver 234b are fixed to each other, and the window portion 234a is moved (opened and closed) in a vertical direction by the driver 234b moving along a rail WR on the basis of control performed by the body control device 230. The door mechanism 232 is not shown in the drawing.

Figures 4, 5:
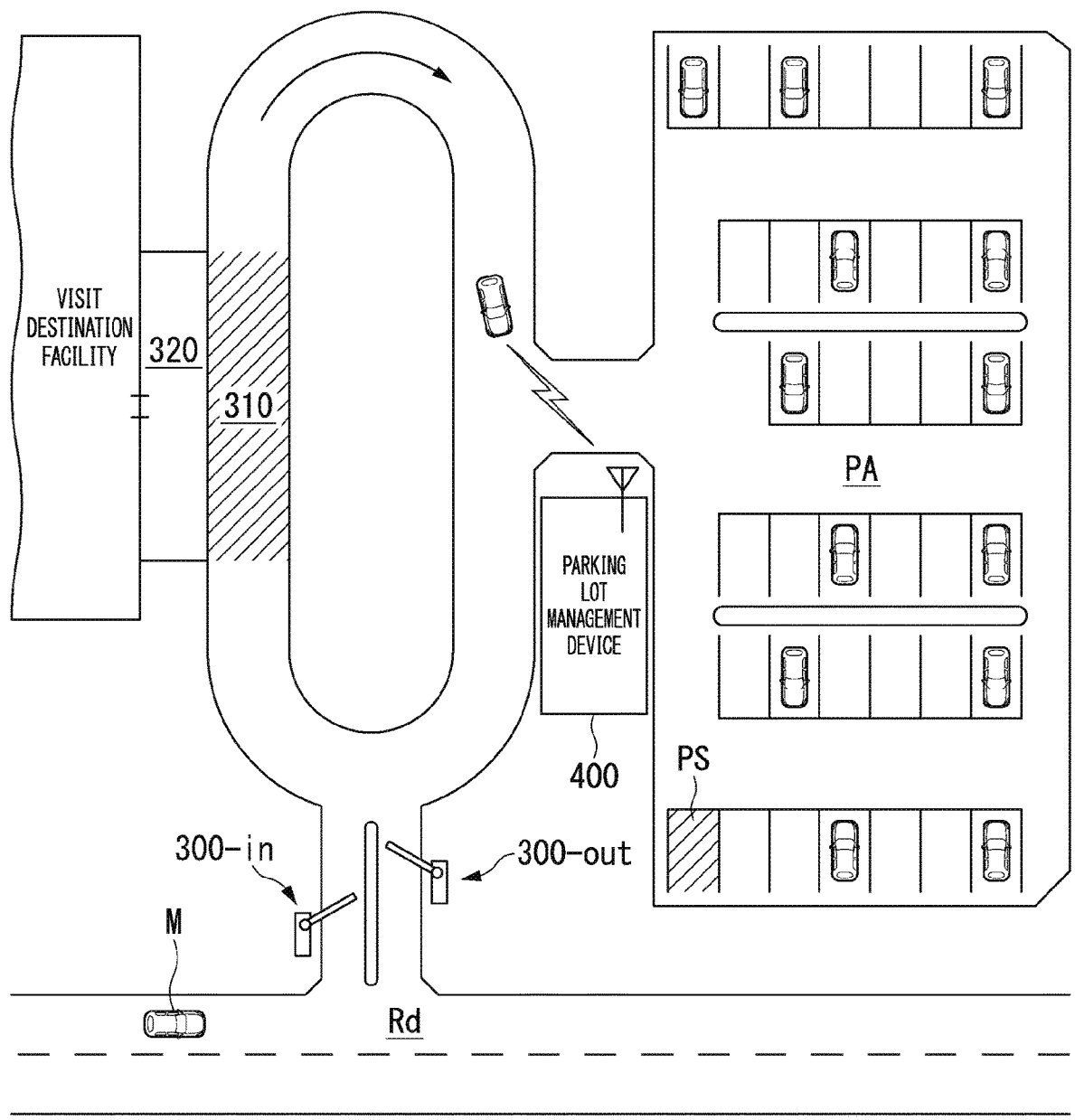
FIG. 4 is a diagram showing an example of gesture control information.
FIG. 5 is a diagram schematically showing a situation in which an autonomous parking event is executed.

FIG. 4 is a diagram showing an example of the gesture control information 192. As in the shown example, the gesture control information 192 is information in which control of a door or a power window performed by the body control device 230 is associated with the type of a user's gesture. For example, in a case where a user's gesture is recognized by the gesture recognizer 132a, and the recognized gesture and any gesture with which control of a door or a power window is associated in the gesture control information 192 are regarded as matching with a degree of similarity equal to or greater than a certain threshold or being the same as each other, the body control device 230 performs control of a door or a power window associated with the same gesture as the gesture recognized by the gesture recognizer 132a in the gesture control information 192. An action of associating a gesture with control of the body control device 230 may be performed by, for example, a purchaser or a seller during initial setting after the host vehicle M is purchased or borrowed.

[Autonomous Parking Event—During Entry]

The autonomous parking controller 142 parks the host vehicle M within a parking space, for example, on the basis of information acquired from a parking lot management device 400 by the communication device 20. FIG. 5 is a diagram schematically showing a situation in which the autonomous parking event is executed. Gates 300-in and 300-out are provided on a route from a road Rd to a visit destination facility. The host vehicle M advances to a stop area 310 through the gate 300-in by manual driving or automated driving. The stop area 310 faces a driveway area 320 which is connected to the visit destination facility. The driveway area 320 is provided with eaves for blocking rain or snow.

The host vehicle M performs automated driving in an unmanned manner after a user exits the vehicle in the stop area 310, and starts the autonomous parking event for movement to a parking space PS within the parking area PA. A start trigger of the autonomous parking event may be, for example, some kind of operation performed by a user, or may be wireless reception of a predetermined signal from the parking lot management device 400. The details of the start trigger of the autonomous parking event will be described later. In a case where the autonomous parking event is started, the autonomous parking controller 142 controls the communication device 20 and transmits a request for parking toward the parking lot management device 400. The host vehicle M moves from the stop area 310 to the parking area PA in accordance with the guidance of the parking lot management device 400 or while performing sensing by itself.

Figure 6:
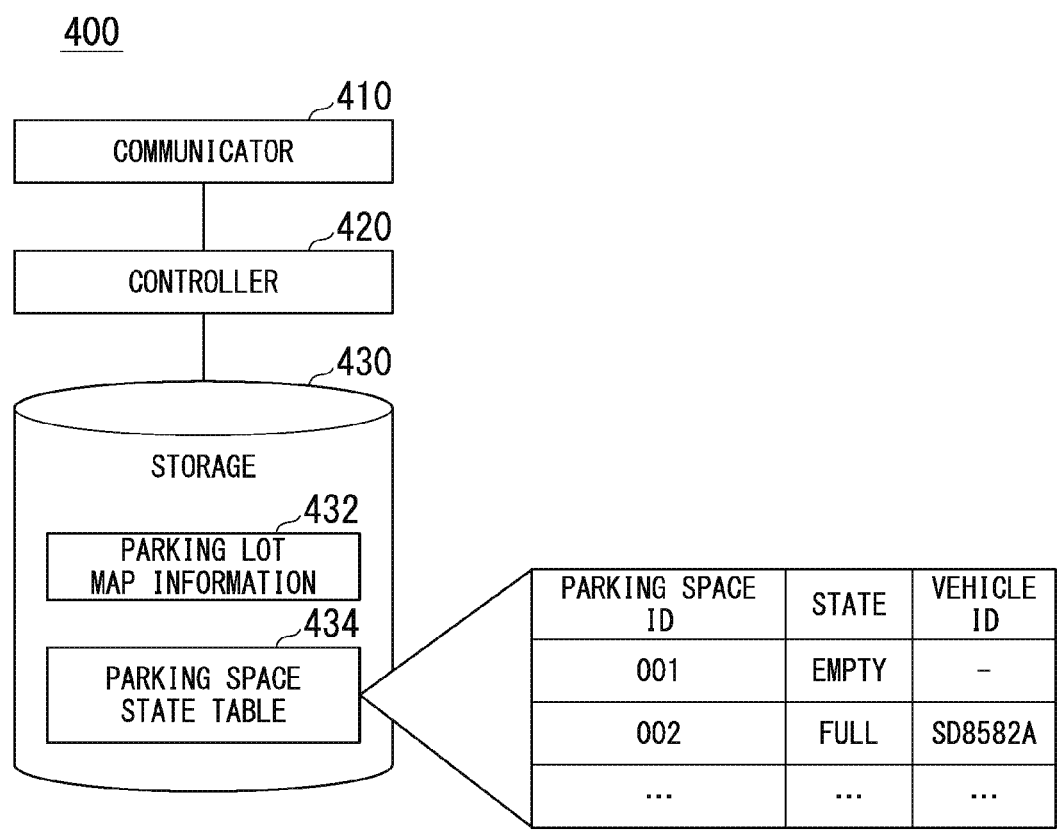
FIG. 6 is a diagram showing an example of a configuration of a parking lot management device.

FIG. 6 is a diagram showing an example of a configuration of the parking lot management device 400. The parking lot management device 400 includes, for example, a communicator 410, a controller 420, and a storage 430. The storage 430 stores information such as parking lot map information 432 and a parking space state table 434.

The communicator 410 communicates with the host vehicle M and other vehicles wirelessly. The controller 420 guides a vehicle to the parking space PS on the basis of information acquired by the communicator 410 and information stored in the storage 430. The parking lot map information 432 is information geometrically indicating the structure of the parking area PA. The parking lot map information 432 includes coordinates for each parking space PS. The parking space state table 434 is, for example, a table in which a state indicating an empty state or a full (parked) state with respect to a parking space ID which is identification information of the parking space PS and a vehicle ID which is identification information of a parked vehicle in the case of a full state are associated with each other.

In a case where the communicator 410 receives a request for parking from a vehicle, the controller 420 refers to the parking space state table 434, to extract a parking space PS of which the state is an empty state, acquire the position of the extracted parking space PS from the parking lot map information 432, and transmit a suitable route to the acquired position of the parking space PS to the vehicle using the communicator 410. The controller 420 instructs a specific vehicle to stop, slow down, or the like as necessary on the basis of positional relationships between a plurality of vehicles so that the vehicles do not advance to the same position simultaneously.

In the vehicle that has received a route (hereinafter referred to as the host vehicle M), the autonomous parking controller 142 generates a target trajectory based on the route. In a case where the parking space PS which is a target approaches, the parking space recognizer 134 recognizes a parking frame line or the like for partitioning the parking space PS, recognizes the detailed position of the parking space PS, and provides the recognized position to the autonomous parking controller 142. The autonomous parking controller 142 receives this to correct the target trajectory, and parks the host vehicle M in the parking space PS.

Without being limited to the above description, the autonomous parking controller 142 may find a parking space in an empty state by itself on the basis of the result of detection performed by the camera 10, the radar device 12, the viewfinder 14, or the object recognition device 16 irrespective of communication, and park the host vehicle M within the found parking space.

The above-described situation during entry is merely an example, and control to be described below may be performed when a user parks a vehicle in the parking area PA in a state where the user is aboard the vehicle in a parking lot facility which is not provided with the stop area 310, when the user approaches the host vehicle M which is stopping in the parking area PA, or when the vehicle moves from a home entrance to a garage in an unmanned manner.

[Start Trigger of Autonomous Parking Event]

The autonomous parking controller 142 determines whether the autonomous parking event is started on the basis of a recognition result of the periphery recognizer 132.

The periphery recognizer 132 recognizes, for example, the position of a user who exits the host vehicle M and is outside of the host vehicle M. The autonomous parking controller 142 determines that the autonomous parking event is started by the periphery recognizer 132 in a case where a user moves a predetermined distance (for example, approximately 50 [cm]) or more from the host vehicle M. The autonomous parking controller 142 determines that the autonomous parking event is started in a case where the user moves a predetermined distance (for example, approximately 50 [cm]) or more from the host vehicle M by the periphery recognizer 132, and a gesture of a request for starting the autonomous parking event is recognized as a result of the gesture recognizer 132a recognizing a gesture performed by the user. Instead, an instruction for the start of the autonomous parking event may be issued through an operation of a smartphone or the like which is used by the user.

The autonomous parking controller 142 does not start the autonomous parking event in a case where it is recognized that the gesture performed by the user recognized by the gesture recognizer 132a is not a gesture of a request for starting the autonomous parking event. In that case, the body control device 230 opens one or more power windows of the host vehicle M on the basis of the result of the gesture recognizer 132a recognizing a gesture performed by the user who is outside of the host vehicle M. Such a gesture may be performed, for example, in a case where the user notices that the user has misplaced some kind of article such as a purse or a smartphone in the interior of the vehicle and attempts to take out the lost article, or a case where both of the user's hands are busy before boarding the vehicle, and the user first attempts to place an article (for example, a paper cup with drink) in the interior of a vehicle. Such a gesture may be performed in order to leave an article that the user has decided not to bring into a visit destination facility (such as, for example, an umbrella), among articles temporarily taken out by the user, in the interior of the vehicle.

For example, the gesture recognizer 132a instructs the body control device 230 to fully open power windows in a case where the gesture recognizer has recognized a gesture of a request for opening the power window as a result of recognition of a gesture performed by the user. The body control device 230 causes the power window mechanism 234 to fully open the power windows on the basis of an input instruction. In that case, the body control device 230 determines a power window to be controlled on the basis of the position of the user recognized by the periphery recognizer 132. The body control device 230 selects and controls, for example, a power window closest to the position of the user recognized by the periphery recognizer 132 as an opening target.

In a case where the user's gesture of a request for closing the power window is recognized by the gesture recognizer 132a, the body control device 230 performs control for closing the power window, and returns the process to the autonomous parking controller 142. The autonomous parking controller 142 determines whether the autonomous parking event is started again on the basis of the recognition result of the periphery recognizer 132.

[Process Flow 1]

Figure 7:
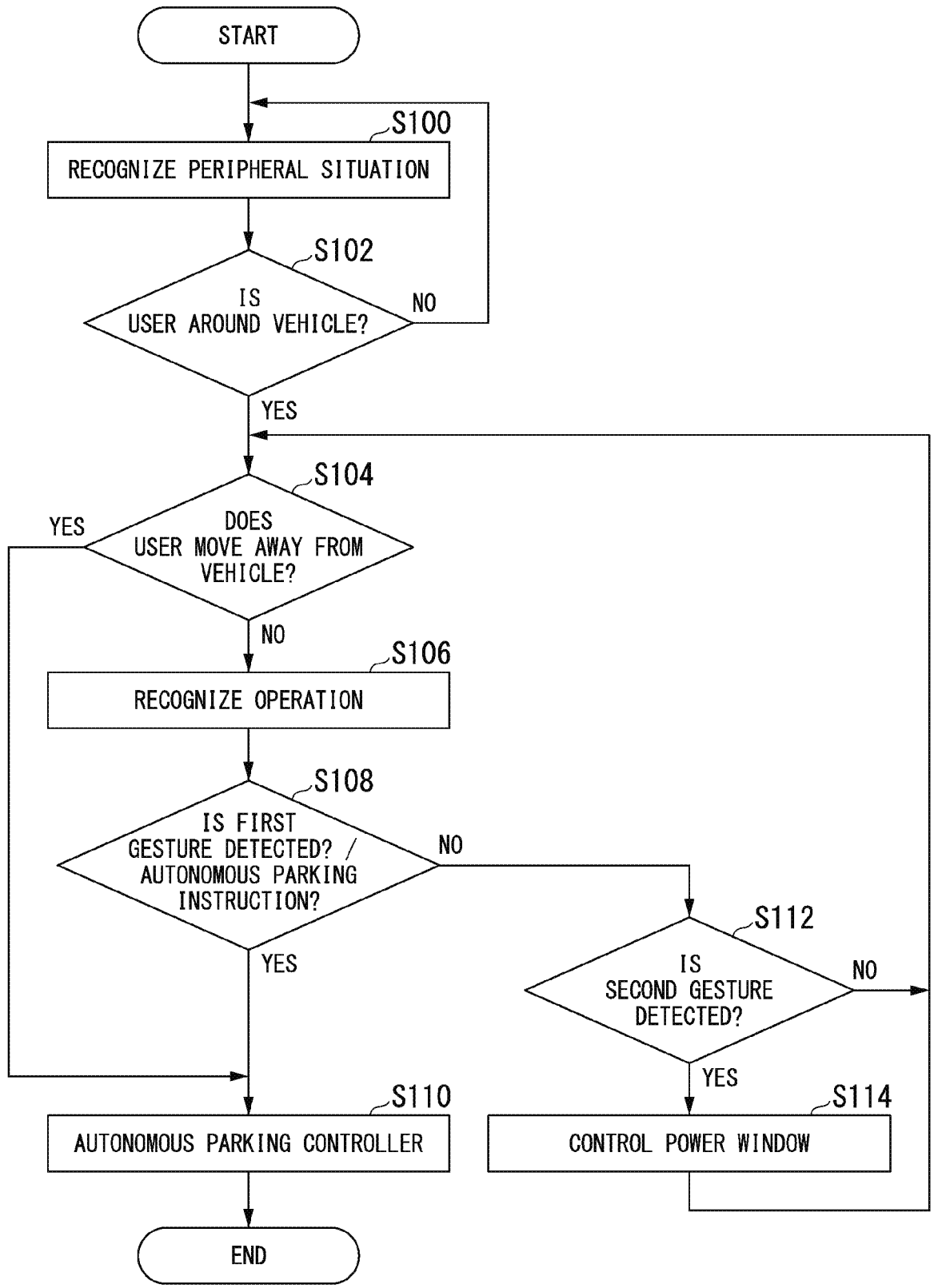
FIG. 7 is a flow chart showing an example of a flow of a series of processes performed by an automated driving control device according to the embodiment.

Hereinafter, a flow of a series of processes performed by the automated driving controller 100 according to the embodiment will be described with reference to a flow chart. FIG. 7 is a flow chart showing an example of a flow of a series of processes performed by the automated driving controller 100 according to the embodiment.

First, the periphery recognizer 132 recognizes the periphery of a vehicle (step S100). Next, the periphery recognizer 132 determines whether the user of the host vehicle M is in the periphery of the vehicle (step S102). In a case where it is determined that the user is not present, the periphery recognizer 132 performs the process of step S100 again after the elapse of a certain period of time. In a case where it is determined that the user is present, the periphery recognizer 132 determines whether the user who is in the periphery of the vehicle moves away from the vehicle (step S104).

In a case where it is determined in the process of step S104 that the user does not move away from the vehicle, the gesture recognizer 132a recognizes the user's operation (step S106), and determines whether a first gesture has been detected (step S108). The first gesture is a gesture indicating that autonomous parking control of the host vehicle M is started. In a case where the first gesture has been detected, the autonomous parking controller 142 starts the autonomous parking event (step S110). In a case where it is determined that the first gesture has not been detected, the gesture recognizer 132a determines whether a second gesture has been detected (step S112). The second gesture is a gesture of a request for opening the power window. In a case where it is determined that the second gesture is not detected, the periphery recognizer 132 returns the process to step S104.

In a case where it is determined in the process of step S112 that the second gesture has been detected, the body control device 230 refers to the gesture control information 192 to perform opening control of the power window associated with the second gesture (step S114), and returns the process to step S104. In a case where it is determined in the process of step S104 that the user moves away from the vehicle, the autonomous parking controller 142 performs the process of step S110. This concludes the description of the processing of the present flow chart.

In the process of step S108 in the flow chart of FIG. 7, the periphery recognizer 132 may recognize that an instruction for the start of the autonomous parking event is issued through an operation of a smartphone or the like which is used by the user.

In the flow chart of FIG. 7, control of the power window being opened by the body control device 230 has been described, but control for closing the power window may be performed, or control of the body control device 230 opening the door in the process of step S114 may be performed in a case where an operation recognized in the process of step S112 is a gesture of a request for opening the door.

[Lost Article Detection]

Hereinafter, a process of detecting a user's lost article which is performed by the lost article detector 136 will be described. After a user exits a vehicle in the stop area 310, the lost article detector 136 determines whether there is a lost article of the user in the interior of the host vehicle M. The detection result of the lost article detector 136 is used as, for example, a determination material when it is determined whether the autonomous parking event is started by the autonomous parking controller 142.

The lost article detector 136 detects a lost article in the interior of a vehicle, for example, by comparing an image captured by the in-vehicle camera 18 before a user boards the host vehicle M with an image captured by the in-vehicle camera 18 after the user exits the vehicle in the stop area 310. The lost article detector 136 detects the presence of an article placed the interior of the vehicle by comparing a plurality of images captured by the in-vehicle camera 18 while the user is aboard the host vehicle M, and detects the article as a lost article in a case where it is detected in the image captured by the in-vehicle camera 18 after the user exits the vehicle. In a case where a lost article is detected, the lost article detector 136 detects the position or size a further detected lost article, and a door or a power window closest to the lost article, and determines whether the lost article can be taken out of the vehicle through the power window.

A method of detecting a lost article which is performed by the lost article detector 136 is not limited to the above-described method, and a detection sensor (such as, for example, a weight sensor, an infrared sensor, or a current sensor) may be installed in a receiving space for a user to temporarily install or receive some kind of article such as, for example, a seat surface, a seat leg, or a trunk interior. In a case where a reading device of a contactless chip (such as, for example, an RFID) is included in a vehicle-mounted device, and a contactless chip associated with the reading device is installed in a lost article, the lost article may be detected on the basis of reading information acquired by the reading device.

In a case where a lost article is not detected by the lost article detector 136, the autonomous parking controller 142 determines that the autonomous parking event may be started. On the other hand, in a case where a lost article is detected by the lost article detector 136, and it is determined that the lost article can be taken out of the vehicle through the power window, the autonomous parking controller 142 is caused to temporarily interrupt the start of the autonomous parking event so that a user can recover the lost article. In that case, the body control device 230 controls the power window mechanism 234 to open a power window closest to the lost article among one or more power windows of the host vehicle M so that a user can recover the lost article on the basis of a result of detection of the lost article performed by the lost article detector 136.

Figure 8:
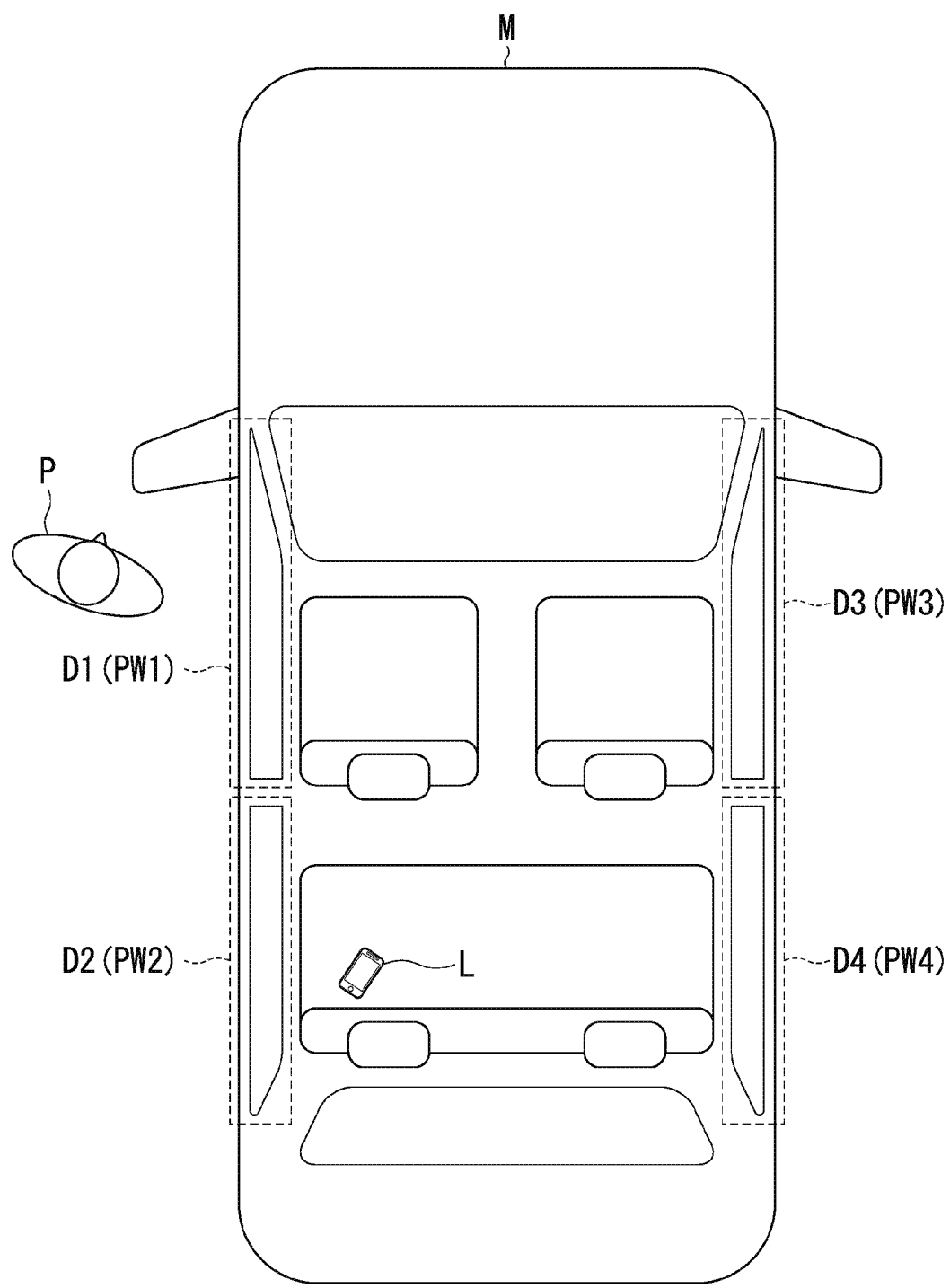
FIG. 8 is a top view showing control performed by a body control device.

FIG. 8 is a top view showing control performed by the body control device 230. The body control device 230 controls, for example, doors D1 to D4 of the host vehicle M and power windows PW1 to PW4 attached to the respective doors.

In the following description, the periphery recognizer 132 is assumed to recognize that a user P is located near the door D1 of the host vehicle M as shown in FIG. 8. In the following description, the lost article detector 136 is assumed to detect that there is a lost article L on a rear seat near the door D2 of the host vehicle M as shown in FIG. 8.

In the example shown in FIG. 8, in a case where the user P takes the lost article L out of the vehicle, the body control device 230 performs control for opening the power window PW2 on the assumption that the lost article is taken out through the power window PW2 closest to a position at which the lost article L is detected by the lost article detector 136. Thereby, the user P can take the lost article L out of the vehicle by moving to the vicinity of the door D2.

The body control device 230 may select a power window to be opened by further adding a result of detection of the size of the lost article L detected by the lost article detector 136 or the position of the user P who is outside of the vehicle recognized by the periphery recognizer 132, or may open the power window PW1 closest to the position of the user P instead of the power window PW2 closest to the lost article L. In a case where sizes (horizontal widths) of opening of the power window PW1 and the power window PW2 are different from each other, the body control device 230 may select a power window to be opened in accordance with the detected size of the lost article L.

In a case where it is detected that a lost article detected by the lost article detector 136 is recovered by a user, and it is further recognized by the gesture recognizer 132*a* that the user has performed a gesture which is an operation of a request for closing a power window, the body control device 230 controls the power window mechanism 234 to close the power window opened in accordance with a result of recognition of a gesture on the basis of the detection result of the lost article detector 136 and the recognition result of the gesture recognizer 132*a*. Such a process of closing a power window may be performed even in a case where a gesture that involves closing a power window (for example, a gesture which is an operation for prompting the host vehicle M to start) is recognized. The autonomous parking controller 142 starts the host vehicle M by starting the autonomous parking event after the power window is closed by the power window mechanism 234 (that is, after the completion of closing control of the power window on which opening control is performed).

In order to start the autonomous parking event even in a case where a lost article detected by the lost article detector 136 is an article left in the interior of a vehicle intentionally by a user, or a case where the user moves away from the host vehicle M without noticing that a power window is opened, the body control device 230 may control the power window mechanism 234 to close the power window when a predetermined time has elapsed since the power window was opened.

The body control device 230 starts, for example, the measurement of an opening time at a timing when a power window is completely opened. The body control device 230 terminates the measurement of the opening time in a case where the power window is opened by the power window mechanism 234, and it is recognized by the periphery recognizer 132 that a user puts his/her hand or the like into the interior of the vehicle through the opened power window. In a case where a predetermined time has elapsed since the power window was opened, the body control device 230 controls the power window mechanism 234 to close the power window.

The body control device 230 does not perform control for closing the power window even in a case where the opening time is set to be equal to or greater than the predetermined time after it is recognized by the periphery recognizer 132 that a user puts his/her hand or the like into the interior of the vehicle through an opened portion of the power window while the power window mechanism 234 is controlled to fully open the power window. In such a case, the body control device 230 performs control for closing the power window when a user's gesture indicating closing of the power window is recognized by the gesture recognizer 132*a*, or only by an operation performed by the user himself/herself.

In a case where it is recognized by the periphery recognizer 132 that a user puts his/her hand or the like into the interior of the vehicle through the opened portion of the power window while the power window mechanism 234 is controlled to fully open the power window, the body control device 230 may lower the speed of opening of the power window so that the user's clothes are not caught, or stop control for opening the power window. In a case where it is recognized by the periphery recognizer 132 that a user puts his/her hand or the like into the interior of the vehicle through the opened portion of the power window during control for closing the power window, the body control device 230 may stop control for closing the power window in order to prevent pinching.

In a case where the periphery recognizer 132 can recognize the weather conditions around the host vehicle M, the body control device 230 may determine whether a door or a power window is controlled on the basis of the weather conditions. For example, in a case where it is recognized by the periphery recognizer 132 that there is a falling matter (such as, for example, rain, snow, ash, or dust) in a space around the host vehicle M, the body control device 230 determines not to perform control for opening the power window as described above in order to prevent the falling matter from entering the interior of the vehicle.

[Control Based on Size of Lost Article]

In a case where it is detected by the lost article detector 136 that there is a lost article in the interior of the vehicle, and it is further determined by the lost article detector 136 that the lost article is too large to be extracted from any of the power windows, the body control device 230 controls the door mechanism 232 or the power window mechanism 234 to perform at least one of opening and closing some or all of the power windows in a different mode from that when a lost article is taken out through the power windows.

The wording "different mode from that when a lost article is taken out through the power windows" refers to, for example, opening all the power windows of the vehicle, stopping the power windows when they are opened by approximately 15 to 10 [cm], opening the power windows by approximately 10 to 15 [cm] and then opening or closing the power windows while vertically moving them by approximately 5 [cm], opening a door closest to a user on the basis of the position of the user recognized by the periphery recognizer 132, opening a door closest to the position of a lost article detected by the lost article detector 136, or the like.

In a case where it is detected that the size of a lost article is, for example, approximately 40 to 50 [cm] long or approximately 50 to 60 [cm] wide, the lost article detector 136 determines that the lost article cannot be taken out through the power windows. In that case, the lost article detector 136 outputs an instruction to open the doors rather than the power windows to the body control device 230.

In a case where a position at which a lost article is detected is located under a seat or the like and there is a high possibility of a user's hand not reaching the lost article even when the user puts his/her arm in through the power windows, or the like, the lost article detector 136 may output an instruction to open the doors rather than the power windows to the body control device 230.

[Target of Lost Article Detection]

The lost article detector 136 may set an article satisfying a condition among articles left in the interior of the vehicle as a target not to be detected as a lost article. For example, in a case where an article loaded at a boarding start point by a user is returned to the boarding start point without being taken down from the host vehicle M at a destination or a transit point, the lost article detector 136 excludes the article from a target to be detected as a lost article. In a case where a place in which lost article detection is not performed (such as, for example, a trunk or a glove box) is set in advance by a user, the lost article detector 136 may exclude an article put into the place from a target to be detected as a lost article.

As a result of recognition (analysis) of an image captured by the in-vehicle camera 18 through deep learning or the like, the lost article detector 136 may estimate the type of article reflected in the image, and detect a lost article on the basis of the estimation result. For example, the lost article detector 136 recognizes in-vehicle equipment (such as, for example, a tissue box, an aromatic, or a blanket) and articles other than the in-vehicle equipment on the basis of the estimation result, and detects the articles other than the in-vehicle equipment as lost articles.

The lost article detector 136 may exclude, for example, things placed in the interior of a vehicle immediately before exit or immediately after exit by a user (such as, for example, an umbrella, gloves, a cap, or a coat) after the host vehicle M stops in the stop area 310, as lost articles.

[Process Flow 2]

Figure 9:
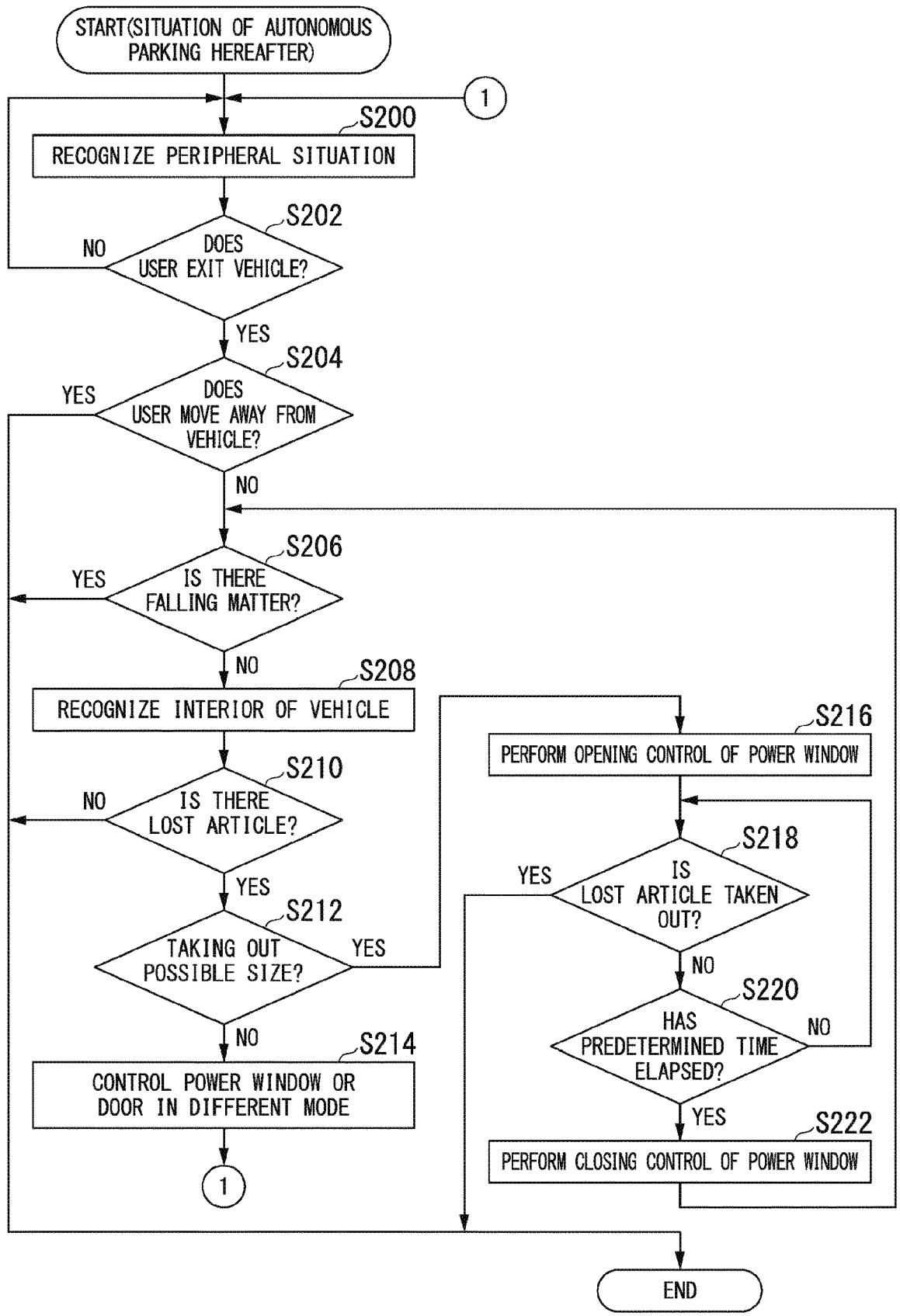
FIG. 9 is a flow chart showing an example of a flow of processes performed by the automated driving control device in a case where a lost article is detected by a lost article detector.

FIG. 9 is a flow chart showing an example of a flow of processes performed by the automated driving controller 100 in a case where a lost article is detected by the lost article detector 136. Processing of the flow chart shown in FIG. 9 is performed simultaneously with the processing of the flow chart shown in FIG. 7.

First, the periphery recognizer 132 recognizes the periphery of the vehicle (step S200). Next, the periphery recognizer 132 determines whether the user of the host vehicle M has exited the vehicle (step S202). In a case where it is determined that the user does not exit the vehicle, the periphery recognizer 132 performs the process of step S200 again after the elapse of a certain period of time. The periphery recognizer 132 determines whether the user who is in the periphery of the vehicle moves away from the vehicle (step S204). In a case where it is determined that the user moves away from the vehicle, the lost article detector 136 terminates the process. Thereby, the autonomous parking control process of step S110 shown in FIG. 7 is started. In a case where it is determined that the user does not move away from the vehicle, the periphery recognizer 132 determines whether there is a falling matter in the periphery of the vehicle (step S206). In a case where it is determined that there is a falling matter, the periphery recognizer 132 terminates the process. Thereby, the autonomous parking control process of step S110 shown in FIG. 7 is started.

In a case where it is recognized that there is no falling matter in the process of step S206, the periphery recognizer 132 recognizes the interior of the host vehicle M (step S208), and next, the lost article detector 136 determines whether there is a lost article in the interior of a vehicle (step S210). In a case where it is determined that is no lost article, the lost article detector 136 terminates the process. Thereby, the autonomous parking control process of step S110 shown in FIG. 7 is started.

In a case where it is determined that there is a lost article in the process of step S210, the lost article detector 136 determines whether the lost article has as large a size as it can be taken out through a power window (step S212). In a case where it is determined that the lost article does not have as large a size as it can be taken out, the body control device 230 controls the door mechanism 232 or the power window mechanism 234 to perform at least one of opening and closing some of all of the power windows or the doors in a different mode from that when a lost article is taken out through the power windows due to indicating impossibility of taking out (step S214), and returns the process to step S208. Power windows or doors opened through the process of step S214 are closed by a user, or closed by the gesture recognized by the processing of the flow chart shown in FIG. 7.

In a case where it is determined that a lost article has as large a size as it can be taken out in the process of step S212, the lost article detector 136 controls the power window mechanism 234 to cause the body control device 230 to open the power window (step S216). Next, the lost article detector 136 determines whether the lost article has been taken out through the power window (step S218). In a case where it is determined that the lost article has been taken out through the power window, the lost article detector 136 terminates the process. The power window opened in this case is closed by a user, or closed by the gesture recognized by the processing of the flow chart shown in FIG. 7.

In a case where it is determined that the lost article is not taken out through the power window in the process of step S218, the body control device 230 determines whether a predetermined time has elapsed since the power window was opened (step S220). In a case where it is determined that the predetermined time has not elapsed, the body control device 230 returns the process to step S218. In a case where it is determined that the predetermined time has elapsed, the body control device 230 controls the power window mechanism 234 to close the power window (step S222), and returns the process to step S206. This concludes the description of the processing of the present flow chart.

According to the embodiment described above, the recognizer 130 that recognizes a peripheral situation of the host vehicle M and the body control device 230 that controls opening and closing of one or more doors and one or more power windows of the host vehicle M are included, and the body control device 230 performs at least one of opening and closing some or all of one or more doors or one or more power windows on the basis of a result of the gesture recognizer 132a recognizing a gesture which is performed by a user who is outside of the host vehicle M, whereby a door or a power window which is appropriate according to the user's situation is selected and control of opening or closing is realized.

[Hardware Configuration]

Figure 10:
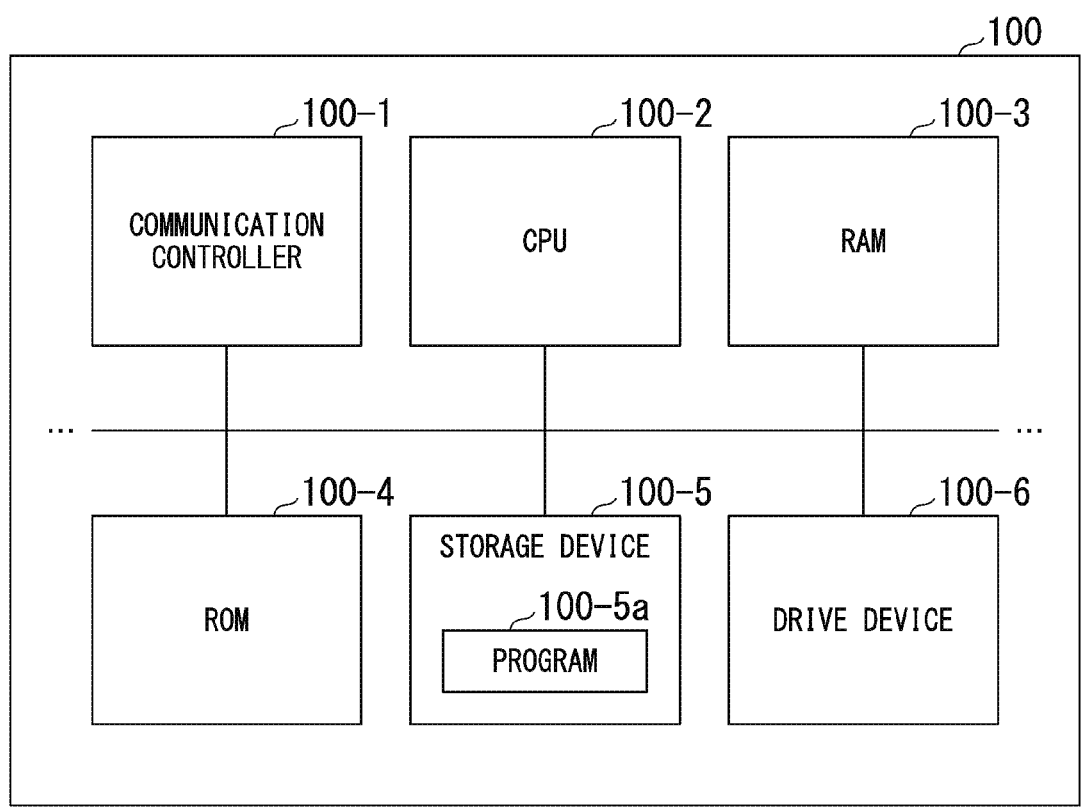
FIG. 10 is a diagram showing an example of a hardware configuration of the automated driving control device according to the embodiment.

FIG. 10 is a diagram showing an example of a hardware configuration of the automated driving controller 100 of the embodiment. As shown in the drawing, the automated driving controller 100 is configured such that a communication controller 100-1, a CPU 100-2, a RAM 100-3 used as a working memory, a ROM 100-4 that stores a boot program or the like, a storage device 100-5 such as a flash memory or an HDD, a drive device 100-6, and the like are connected to each other through an internal bus or a dedicated communication line. The communication controller 100-1 performs communication with components other than the automated driving controller 100. The storage device 100-5 stores a program 100-5a executed by the CPU 100-2. This program is developed into the RAM 100-3 by a direct memory access (DMA) controller (not shown) or the like, and is executed by the CPU 100-2. Thereby, some or all of the first controller 120 and the second controller 160 are realized.

The above-described embodiment can be represented as follows.

A vehicle control device including:
a storage device having a program stored therein; and
a hardware processor,
wherein the hardware processor executes the program stored in the storage, to thereby
recognize a peripheral situation of a vehicle and
control opening and closing of a window portion of the vehicle on the basis of a result of recognition of a gesture which is performed by a user who is outside of the vehicle.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

The body control device 230 may change, for example, a size for opening a door or a power window in accordance with the size of a lost article detected by the lost article detector 136. For example, in a case where the lost article detector 136 detects sunglasses of a sun visor as a lost article, the body control device 230 may control the power window mechanism 234 to open a power window closest to the sun visor to such an extent that a user's hand gets in and the sunglasses can be taken out (for example, 20 [cm]), or may not fully open the power window.

What is claimed is:

1. A vehicle control device comprising:
a processor that executes instructions to:
recognize a peripheral situation of a vehicle; and
control opening and closing of a window portion the vehicle; and
detect a lost article located in an interior of the vehicle,
wherein the processor controls opening and closing of the window portion on the basis of a recognition result of a gesture performed by a user of the vehicle,
wherein the processor determines whether the lost article is able to be taken out of the vehicle through the window portion, and
wherein the processor opens a window portion being the closest to the lost article among window portions on the basis of a detection result.

2. The vehicle control device according to claim 1, wherein the processor further recognizes a position of the user, and
in a case where the processor recognizes the gesture of a request for opening window portions and the position of the user who has performed the gesture, the processor opens a window portion closest to the position of the user among the window portions.

3. The vehicle control device according to claim 1, wherein, in a case where the processor recognizes the gesture of a request for closing window portions, the processor closes a window portion closest to a position of the user among the window portions.

4. The vehicle control device according to claim 1, wherein, in a case where it is detected that the lost article is recovered by the user, and the gesture of a request for closing window portions is further recognized, the processor closes an opened window portion on the basis of the gesture recognized.

5. The vehicle control device according to claim 1, wherein the processor closes an opened window portion in a case where a predetermined time has elapsed since some or all of the window portions were opened on the basis of the gesture recognized.

6. The vehicle control device according to claim 1, wherein, in a case where the user's gesture for prompting start of the vehicle is recognized, the processor closes an opened window portion on the basis of the gesture recognized.

7. The vehicle control device according to claim 6, the processor further executes instructions to:
control steering and a speed of the vehicle irrespective of the user's operation on the basis of the recognition result,
wherein the processor starts the vehicle after completion of closing control of a window portion on which opening control is performed on the basis of the gesture for prompting start of the vehicle recognized.

8. The vehicle control device according to claim 1, wherein, in a case where it is determined that the lost article is not able to be taken out of the vehicle through any of the window portions, the processor performs at least one of opening and closing one or more doors or some or all of the window portions of the vehicle in a different mode from that when the lost article is taken out through the window portion.

9. The vehicle control device according to claim 8, wherein the processor opens all the window portions of the vehicle in a case where it is determined that the lost article is not able to be taken out of the vehicle through any of the window portions.

10. The vehicle control device according to claim 8,
wherein the processor opens a door closest to the user or a door closest to the lost article in a case where it is determined that the lost article is not able to be taken out of the vehicle through any of the window portions.

11. The vehicle control device according to claim 1,
wherein, in a case where an article loaded at a boarding start point by the user is returned to the boarding start point without being removed from the vehicle at a destination or a transit point, the processor excludes the article as a target to be detected as the lost article.

12. The vehicle control device according to claim 1,
wherein the processor recognizes weather conditions around the vehicle and does not open the window portion in a case where there is a falling matter in a space around the vehicle.

13. A vehicle control method comprising causing a vehicle control device to:
recognize a peripheral situation of a vehicle;
control opening and closing of a window portion of the vehicle on the basis of a result of recognition of a gesture which is performed by a user of the vehicle who is outside of the vehicle;
detect a lost article located in an interior of the vehicle;
determine whether the lost article is able to be taken out of the vehicle through the window portion; and
open a window portion closest to the lost article among window portions on the basis of a detection result.

* * * * *